(12) United States Patent
Gibson et al.

(10) Patent No.: US 6,325,535 B1
(45) Date of Patent: Dec. 4, 2001

(54) IN-SITU RADIANT HEAT FLUX PROBE COOLED BY SUCTION OF AMBIENT AIR

(75) Inventors: William C. Gibson; Mike Duffield; James T. Eischen, all of Tulsa; Robert L. Gibson, Broken Arrow, all of OK (US)

(73) Assignee: Petro-Chem Development Co., Inc., New York, NY (US)

( * ) Notice: Subject to any disclaimer, the term of this patent is extended or adjusted under 35 U.S.C. 154(b) by 0 days.

(21) Appl. No.: 09/379,044

(22) Filed: Aug. 23, 1999

(51) Int. Cl.$^7$ .................................................. G01K 17/00
(52) U.S. Cl. ........................... 374/29; 374/141; 374/179; 122/504.2
(58) Field of Search ............................ 374/179, 29, 141; 136/230, 233; 122/504.2

(56) References Cited

U.S. PATENT DOCUMENTS

| | | | |
|---|---|---|---|
| 1,478,821 | * 12/1923 | Foster | 374/179 |
| 3,774,297 | * 11/1973 | Wagner | 136/233 |
| 3,935,032 | * 1/1976 | Brandeberry et al. | 374/179 |
| 4,514,096 | * 4/1985 | Wynnyckyj et al. | 374/29 |
| 4,519,830 | * 5/1985 | Wolak | 136/230 |
| 4,722,610 | * 2/1988 | Levert et al. | 374/29 |
| 4,854,729 | * 8/1989 | Lovato | 374/179 |
| 4,889,483 | * 12/1989 | Gentry | 374/179 |
| 5,152,608 | * 10/1992 | Dutcher et al. | 374/179 |
| 5,718,512 | * 2/1998 | Ngo-Beelmann | 374/179 |

OTHER PUBLICATIONS

S. B. H. C. Neal et al, "Measurement of Radiant Heat Flux in Large Boiler Furnaces–II Devel. of Flux Measuring Inst.", Int'l J. Heat and Mass Transfer, vol. 23, pp. 1023–1031, Great Britain, 1980.*

M.C. Ziemke, Heat Flux Transducers, Instruments and Control Systems, vol. 40, pp. 85–88, (5 pages) Dec. 1967.*

TSI Technical Bulletin No. C26 "Heat Flux System", Thermo–Systems Inc., Minneapolis, Minn., (4 pages) Dec. 1963.*

TSI Technical Bulletin No. 263 "Heat Flux System", Thermo–Systems Inc., Minneapolis, Minn., Jul. 1963.*

NASA SP–5050, "NASA Contributions to Development of Special–Purpose Thermocouples", pp. 55–66 1968.*

* cited by examiner

Primary Examiner—Diego Gutierrez
Assistant Examiner—Stanley J. Pruchnic, Jr.
(74) Attorney, Agent, or Firm—Head, Johnson and Kachigian

(57) ABSTRACT

A probe for determining the heat flux in a direct-fired heater. The direct-fired heater is under a vacuum pressure. This vacuum pressure induces a small quantity of ambient air through a ceramic insulating tube and eventually into the heater. The induced air cools an absorber head and receptacle, causing heat to flow from a target to a base. The target is an outer surface of the absorber head exposed to radiant heat inside the direct-fired heater. The base is that portion of the absorber head and receptacle which has a surface exposed to cooling air within the ceramic tube. The vacuum pressure inside the heater causes ambient air to be induced into a second end of the ceramic tube. Air passages at a first end of the ceramic tube cause the induced air to flow past the base and into the heater. A thermocouple is fitted into a cylindrical slot inside the receptacle. First and second thermocouple wires extend from the thermocouple to a weatherhead, which has electrical contacts which connect to the first and second thermocouple wires and to instrumentation, such as a digital meter or other input, output device such as a microprocessor or computer for monitor and control of heat flux. After measuring the thermocouple temperature in the receptacle, one can then determine the heat flux through the target by experimental correlations.

7 Claims, 3 Drawing Sheets

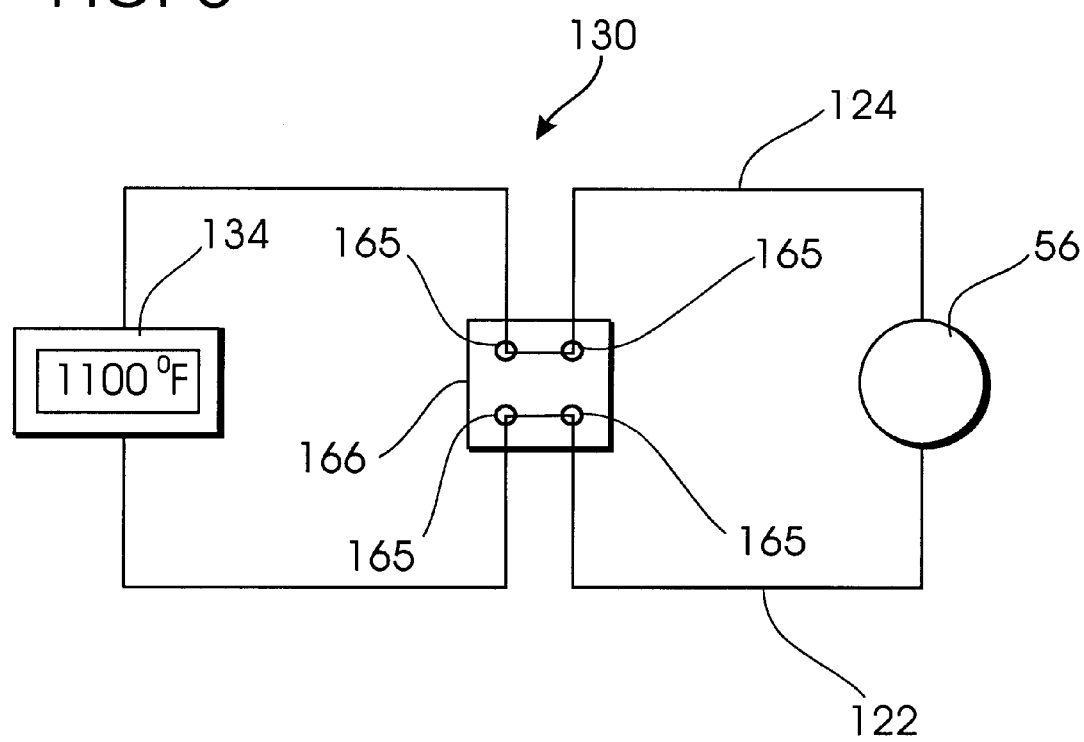

IN-SITU RADIANT HEAT FLUX PROBE COOLED BY SUCTION OF AMBIENT AIR

BACKGROUND OF THE INVENTION

1. Field of the Invention

The present invention relates to devices for determining radiant heat flux.

2. Description of the Related Art

When a mass is placed in an enclosure whose walls are at a temperature above that of the mass, the temperature of the mass will increase even if the enclosure is evacuated. The process by which heat is transferred from the enclosure to the mass by virtue of the temperature difference between the enclosure and the mass, without the aid of any intervening medium, is called thermal radiation. The emission of thermal radiation is governed by the temperature of the enclosure.

Direct-fired heaters are commonly used in many applications. Direct-fired heaters have an interior combustion chamber in which an ignition source, fuel and oxygen react to form a flame. The flame is commonly formed near the bottom of the heater and the combustion products exit the top of the heater through a flue. Fluid tubes are positioned along walls of the heater. The difference between density of the hot gases inside the heater and the density of cooler ambient air creates a vacuum pressure inside the heater. A vacuum pressure is a pressure below the ambient atmospheric pressure.

Radiant heat flux is the radiant heat transfer per unit area across a control surface. In direct-fired heaters, it is desirable to measure the radiant heat flux rate because locally high flux rates may shorten equipment life and increase the need for frequent cleaning of the equipment. High flux rates also cause carbon deposits to form in a fluid film at the inside wall of fluid tubes positioned inside the heater.

In order to determine the heat flux, a cooling mechanism is needed to maintain a probe tip cooler than a static equilibrium temperature inside the heater, so that a net heat transfer will occur through the tip. In the past, in-situ heat flux probes have been cooled by pumping or compressing a fluid (gas or liquid) through the probe. These devices, however, have several disadvantages. One disadvantage is these devices require moving parts such as pumps, metering devices and valves. Another disadvantage is these devices require an external supply to power the pump or compressor that transports the cooling fluid.

SUMMARY OF THE INVENTION

The present invention is for a radiant heat flux probe which may be cooled by the induction of cool air outside the heater. The probe is also capable of receiving air compressed by an external source if the gas pressure in the heater at the probe is above the outside air pressure. The heat flux probe is cooled by providing an air passage from ambient outside air to a portion of the heater having a pressure below the outside atmospheric pressure, thus causing ambient air to be induced through the heat flux probe into the heater.

A heat absorber is attached to a first end of a hollow ceramic insulating tube. A drum of the heat absorber fits through an opening in the first end of the ceramic tube and into a bore of a receptacle located inside the ceramic tube. A head of the heat absorber protrudes from the first end of the ceramic tube. The ceramic tube is a conduit to provide pressure communication between the inside of the heater and the ambient atmosphere. The ceramic material of the tube is an insulator and prevents ambient air induced through the tube from becoming too hot before it reaches the heat absorber and receptacle.

The modes of heat transfer within, from, and to the probe are different for different parts of the probe. The outside surface of the absorber head, which is exposed to the flame and hot combustion products inside the heater, is called a target. A portion of the receptacle and the heat absorber (when connected together) which has a surface exposed to the induced cooling air is referred to as a base. The portions of the heat absorber head and receptacle (when connected together) located between the base and the target is referred to as a body. At the target, there are two primary heat transfer modes. Heat is transferred to the target by thermal radiation and transferred away from the target by conduction. Within the body, heat is transferred to, through, and from the body by heat conduction. Heat is transferred to the base by conduction and is removed at the surface of the base by convection.

A thermocouple is positioned in a cylindrical slot at the second end of the receptacle. A compression nut holds the thermocouple in place in the cylindrical slot. Thermocouple wires extend from the thermocouple, through the ceramic tube, and to a temperature indicating device, such as a solid-state digital meter, located outside the heater. The ceramic tube butt fits into a first end of a pipe adapter. A second end of the pipe adapter fits into a first end of a pipe reducer. The pipe reducer is threadably connected to a plate which is rigidly attached to a wall of the heater, with the first end of the reducer inside the heater and a second end of the reducer positioned outside the heater.

A first end of a first pipe nipple fits into the second end of the pipe reducer. A second end of the first pipe nipple fits into a first port of a pipe tee. The pipe tee has a first port, a second port, and a third port. The third port of the pipe tee is open to ambient air. A first end of second pipe nipple fits into the second port of the pipe tee. A second end of the second pipe nipple fits into a first opening of a weatherhead. The weatherhead also has a second opening which is open to ambient air. The weatherhead has electrical contacts which connect to ends of the thermocouple wiring and to wire leads for instrumentation, such as a digital meter.

To determine the heat flux through a heat absorber head outer surface, a thermocouple is used to determine the temperature at a point inside the receptacle attached to the heat absorber. Using an experimental correlation, one can then determine the heat flux passing through the target.

It is, therefore, a principal object of the present invention to provide a radiant heat flux probe which is capable of being cooled without the use of an independent power supply to compress gas or pump fluid.

It is another object of the present invention to provide a radiant heat flux probe which is capable of being cooled without any moving parts.

Other objects and further scope of the applicability of the present invention will become apparent from the detailed description to follow taken in conjunction with the accompanying drawings.

BRIEF DESCRIPTION OF THE DRAWINGS

FIG. 5 shows a simplified schematic diagram of a thermocouple circuit.

DETAILED DESCRIPTION OF THE PREFERRED EMBODIMENTS

Figure 1:
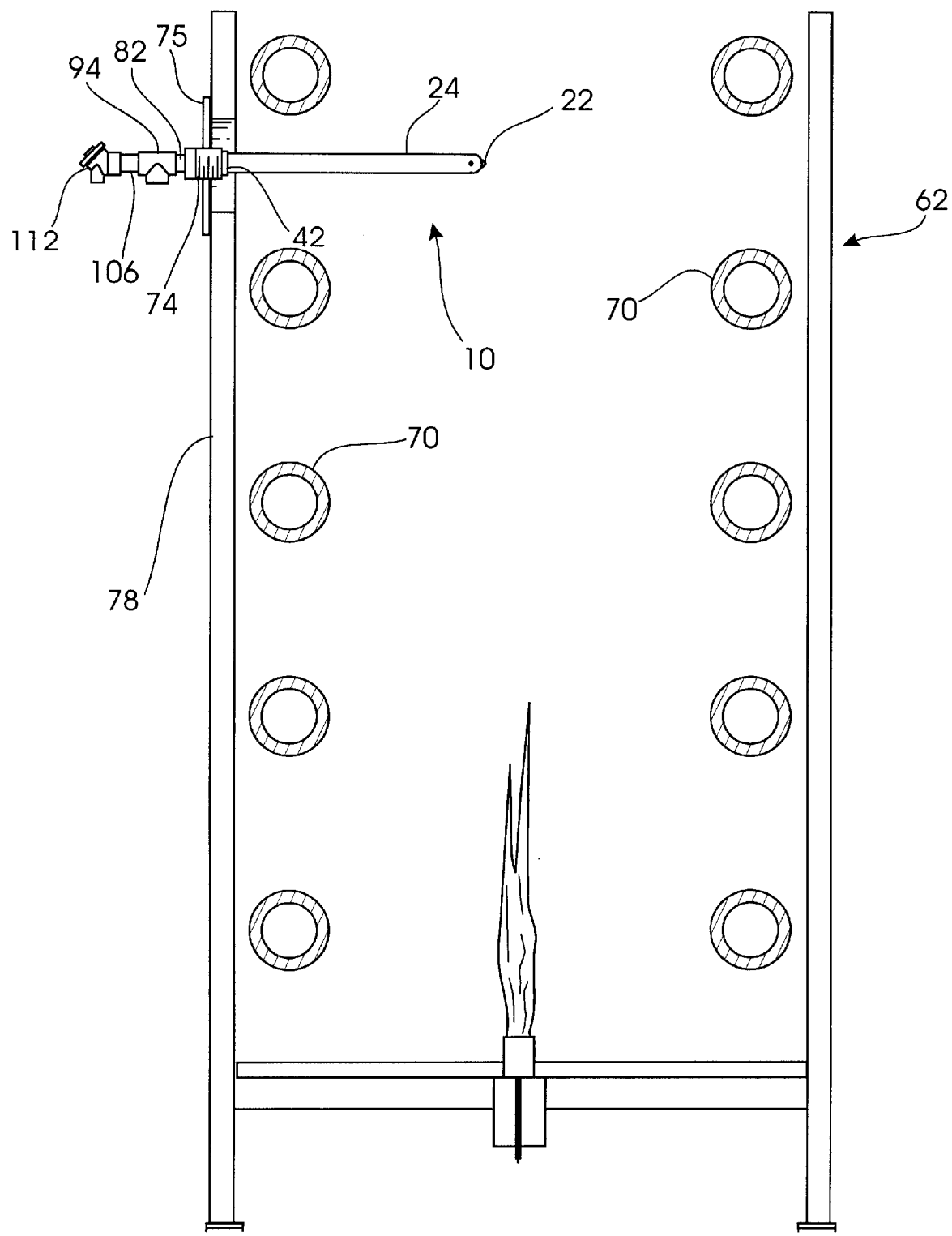
FIG. 1 is a side view of a radiant heat flux probe constructed in accordance with the present invention in a direct-fired heater.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Like numbers in the drawings indicate like parts in the various embodiments of the present invention.

In FIGS. 1 through 4, radiant flux probe 10 extends perpendicularly from heater wall 78. It will be understood that other orientations are possible within the scope of the invention. The probe 10 extends past fluid tubes 70 along the heater wall by a distance approximately one and one-half times the diameter of the fluid tubes 70. The radiant heat flux probe 10 has a heat absorber 22 protruding from a hollow ceramic tube 24. The heat absorber 22 has a cylindrical drum 26 and a head 28, which is generally conical in shape. The absorber drum 26 is threaded and screws into female threads in receptacle 34. The receptacle 34 is positioned in a first end 36 of the ceramic tube 24. A resilient gasket 41 is positioned between the absorber head 28 and the ceramic tube 24, so that tightening the drum 26 in the receptacle 34, does not break the ceramic tube 24. The second end 40 of the ceramic tube 24 butt fits or is otherwise secured into a pipe adapter 42. The outer surface of the heat absorber head 28 is called a heat absorber target 14.

The receptacle 34 is made of a metallic heat-conducting material. To fit the heat absorber 22 into the receptacle 34, the receptacle 34 is placed inside the tube first end 36. The absorber drum 26 is placed through a ceramic tube first end opening 44 and male threads 30 on the absorber drum 26 are mated to female threads 32 in bore 33 on a receptacle first end 35, such that the absorber head 28 protrudes from the tube first end 36. On the second end 37 of the receptacle 34, a first inner cylindrical wall 48 of the receptacle 34 defines a cylindrical slot 50 and a second inner cylindrical wall 46 of the receptacle 34 defines a cylindrical hollow 52 with internal threads 53.

The portions of the heat absorber head 28 and the receptacle 34 (when connected together) which has a surface exposed to cooling air is called a base 18. The portions of the heat absorber head 28 and the receptacle 34 (when connected together) located between the base 18 and the target 14 is called a body 16.

Figure 3:
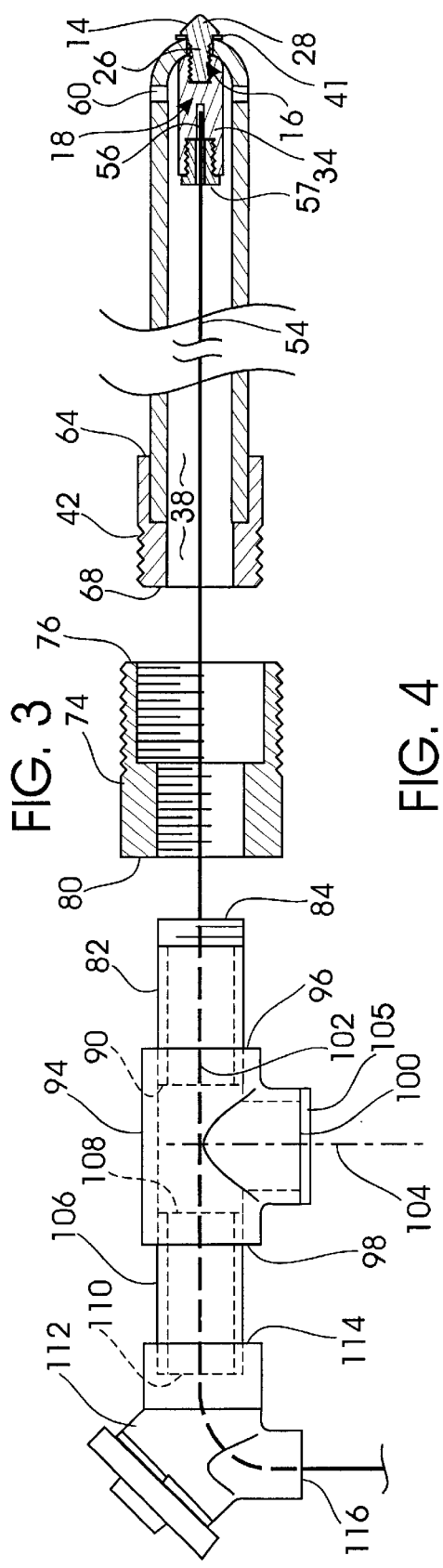
FIG. 3 is a partial section view of a radiant heat flux probe of the present invention shown in FIG. 1.
Figure 4:
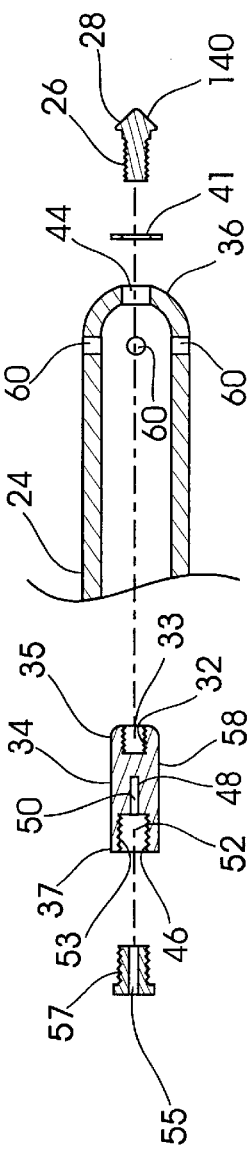
FIG. 4 is a partial, enlarged view of a first end of a radiant heat flux probe of the present invention.

Thermocouple wiring 54, seen in FIG. 3, fits through a hole 55 in a compression nut 57, and into the cylindrical slot 50. A thermocouple 56 is placed in the slot 50 and external threads 59 on the compression nut 57 screw into the cylindrical hollow internal threads 53, to secure the thermocouple 56 to the receptacle 34.

Figure 2:
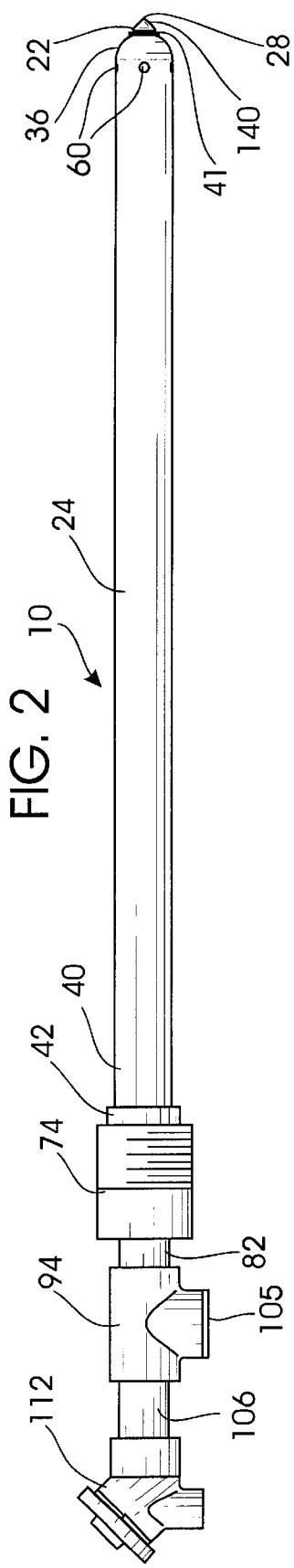
FIG. 2 is a side view of a radiant heat flux probe of the present invention shown in FIG. 1.

Returning to a consideration of FIGS. 2 and 3, the ceramic tube first end 36 has air exit passages 60 which provide pressure communication between the air inside the ceramic tube 24 and the gases inside the heater 62. The ceramic tube 24 has an interior chamber 38. Because the pressure of the gases inside the heater 62 are usually less than atmospheric pressure, ambient air is induced through the probe 10 and into the heater 62.

The second end 40 of the ceramic tube 24 fits into a first end 64 of pipe adapter 42. The pipe adapter second end 68 has male threads which mate with female threads in a first end 76 of pipe reducer 74. The pipe reducer 74 is threadably attached to a plate 75, which is rigidly fixed in heater wall 78, so that the reducer first end 76 is inside the heater 62 and a reducer second end 80 is outside the heater 62. A first threaded end 84 of a first pipe nipple 82 screws into female threads in the second end 80 of pipe reducer 74.

A second threaded end 90 of the first pipe nipple 82 mates with female threads in a first port 96 of pipe tee 94. The pipe tee 94 has a second port 98 in line with the first port 96 and a third port 100. Centerline 102 of the first port 96 and the second port 98 coincide and a centerline 104 of the third port 100 intersects centerline 102 at a ninety degree angle. The third port 100 is normally open to provide an air intake for the probe 10. A screen 105 covers the third port 100 to prevent contamination of the air.

A threaded first end 108 of a second pipe nipple 106 screws into female threads in the second port 98 of pipe tee 94. A second end 110 of the second pipe nipple 106 fits into a first opening 114 in a pipe weatherhead 112. A second opening 116 in the weatherhead 112 is open to ambient air. Various other connections are, of course, possible within the scope of the invention.

Generally, thermocouples are formed from dissimilar metals, such as chromel and alumel. The dissimilar metals generate an electromotive force at their thermocouple junction. The force generated is dependent upon the wiring material and the temperature of the thermocouple. Connecting the other two ends of the wire together forms a thermocouple circuit and current flows through the wire. Commonly, a potentiometer or solid-state digital meter is then used to indicate a temperature of the thermocouple.

The thermocouple wiring 54 consists of a first thermocouple wire 122 and second thermocouple wire 124 leading away from the thermocouple 56. The thermocouple wires 122 and 124 connect to electrical contacts 165 of a terminal block 166 in the weatherhead 112. Thermocouples are well known in the heating art as temperature measurement devices and, by itself, the thermocouple is not part of the invention. The electrical leads from instrumentation, such as the solid state digital meter 134 shown in FIG. 5, connect to the terminal block 166 to form the thermocouple circuit 130.

The ceramic tube 24 shields the first wire 122 and second wire 124 from radiant heat and provides insulation against heat transfer for the relative cool air inside the ceramic tube 24.

Although the radiant heat flux probe 10 is generally intended for use with the ambient air being drafted through the probe 10, compressed air (not shown) may also be forced through the probe 10, using the pipe tee third port 100 as an air supply inlet.

Heat Transfer Analysis

The equilibrium temperature of the tip of the probe is dependent on the amount of incoming radiation which is absorbed or reflected by the tip. In the absence of cooling, the temperature of the probe tip would eventually be the equilibrium temperature of hot flue gas adjacent to the tip, regardless of the amount of radiation from got combustion products or flames.

With cooling of the target, body and base, the equilibrium temperature of the thermocouple in the probe depends on the amount of radiation absorbed by the target, conducted through the base, and the amount convected away from the base by the cooling air.

Although experimental correlations are used to determine the heat flux from the thermocouple temperature, it is useful to consider the theoretical formulation relating heat flux and temperature. The radiative heat transfer from the heater to the target can be approximated by assuming the target acts as a black body and absorbs all wavelengths of radiation emitted by the gases in the heater. For thermal radiation of a black body in a spherical enclosure, the heat flux is estimated by the Stefan-Boltzman relation:

$$q = a(T_h^4 - T_s^4)$$

where a=Stefan-Boltzman Constant $T_h$=temperature of the gas in the heater and $T_s$=temperature of the target.

For convective heat transfer in the heater, the convective heat transfer is determined from the equation:

$$q = u(T_h - T_s)$$

where q=the heat flux convected to the target u=convective heat transfer coefficient.

Because $T^4$ is much greater than T for the temperatures of interest, radiative heat transfer is the dominant mode of heat transfer in the heater.

In the body and base of the probe, heat is conducted away from the target by conduction. Assuming an isotropic, homogeneous material, the heat flux conducted away from the target can be determined by Fourier's law of heat conduction:

$$q = -k\nabla T$$

where q=the heat flux k=the conductivity of the material

Inside the ceramic tube, heat is convected away from the base by convection. The relation between the heat flux and the temperature along the boundary of the base can be approximated by:

$$q = u(T_b - T_a)$$

where q=the heat flux at the outer surface of the base;

u=the convective heat transfer coefficient $T_b$=the temperature along the outer surface of the base and $T_a$=ambient temperature of air drafted through the ceramic tube.

In general, the convective heat transfer coefficient is not a constant and one would expect it to vary with: (1) temperature and (2) the difference between the pressure of the heater interior and the ambient air pressure.

Thus, the governing equation of heat transfer within the probe is Fourier's law $$q = -k\,\nabla T.$$

Boundary conditions are prescribed on the boundary for a steady state condition:

$$q(\text{target}) = a(T_h^4 - T_s^4) \qquad \text{I}$$

$$q(\text{base outer surface}) = u(T_b - T_a) \qquad \text{II}$$

These boundary conditions are nonlinear and Fourier's law for these boundary conditions is not amenable to a simple solution. Thus, one must use experimental correlations to relate the measured thermocouple temperature to the heat flux to the target.

The present invention has been described in relation to the drawings attached hereto, but it should be understood that other and further modifications, apart from those shown or suggested herein, may be made within the spirit and scope of this invention.

What is claimed is:

1. In a direct fired heater with walls, having a vacuum pressure inside the heater, a device in combination with said heater for determining radiant heat flux, the device comprising:

(a) a heat absorber positioned within an internal portion of said heater, said heat absorber cooled as a consequence of vacuum pressure induced ambient air introduced into the internal portion of said heater; and (b) a thermocouple for measuring a temperature of said heat absorber.

2. In a direct fired heater with walls, having a pressure inside the heater lower than the atmospheric pressure outside the heater, a device in combination with said heater for determining radiant heat flux, the device comprising:

(a) a hollow ceramic tube with a first end and a second end, said ceramic tube having
  (i) air exit passages at said first end;
  (ii) a ceramic tube second end opening; and
  (iii) an interior chamber;

(b) a metallic heat absorber with an absorber head and an absorber drum;

(c) a receptacle for receiving said absorber drum, said receptacle having a bore on a receptacle first end and a cylindrical slot on a receptacle second end;

(d) said heat absorber drum fitting into said receptacle bore, such that said heat absorber head protrudes outside of said ceramic tube;

(e) a thermocouple fitted into a cylindrical slot inside said receptacle;

(f) means for indicating a temperature of said thermocouple; and (g) means for attaching said ceramic tube to one of the heater walls, wherein said ceramic tube second end opening is open to ambient air so that said interior chamber of said ceramic tube is in pressure communication with ambient air.

3. The device for determining radiant heat flux of claim 2 wherein said means for indicating a temperature of said thermocouple comprises:

(a) a first thermocouple wire and a second thermocouple wire attached to said thermocouple; and (b) a solid-state digital meter connected to said first thermocouple wire and said second thermocouple wire.

4. The device for determining radiant heat flux of claim 3 wherein said means for attaching said ceramic tube to one of said heater walls comprises:

(a) a pipe adapter with a first end and a second end, said ceramic tube second end matingly engaging said pipe adapter first end; and (b) a pipe reducer threadably attached to a plate rigidly fixed to one of the heater walls, wherein said first end of said adapter is inside said heater and fits into a first end of said pipe reducer, and wherein said second end of said reducer is positioned outside the heater and has an opening to ambient air.

5. The device for determining radiant heat flux of claim 4 further comprising:
(a) a first pipe nipple with a first end and a second end, said first end of said first pipe nipple matingly engaging said second end of said pipe reducer;
(b) a pipe tee with a first outlet port, a second port and a third port, wherein
  (i) said first pipe nipple fits into said pipe tee first outlet port; and
  (ii) said pipe tee third port is open to ambient air;
(c) a second pipe nipple with a first end and a second end, said second pipe nipple first end fitting into said pipe tee second port;
(d) a weatherhead with a first opening and a second opening, said second pipe nipple second end fitting into said weatherhead first opening, wherein said weatherhead is open to ambient air;
(e) wherein said ambient air is in pressure communication with the heater; and
(f) wherein said first and second thermocouple wires fit through said ceramic tube, said pipe adapter, said pipe reducer, said first pipe nipple, said pipe tee, said second pipe nipple, said first opening in said weatherhead, and attaches to electrical contacts in said weatherhead.

6. In combination a direct fired heater with walls, having a pressure inside the heater lower than the atmospheric pressure outside the heater, and a device for determining radiant heat flux, the device comprising:
(a) a hollow ceramic tube with a first end and a second end, with air exit passages at said first end; an opening at said second end; and all interior chamber;
(b) a metallic heat absorber with an absorber head and an absorber drum;
(c) a receptacle for receiving said absorber drum, said receptacle having a bore on a receptacle first end and a cylindrical slot on a receptacle second end;
(d) said heat absorber drum fitting into said receptacle bore, such that said heat absorber head protrudes outside of said ceramic tube;
(e) a thermocouple fitted into a cylindrical slot inside said receptacle;
(f) a means for indicating a temperature of said thermocouple with a first thermocouple wire and a second thermocouple wire attached to said thermocouple; and a solid-state digital meter connected to said first thermocouple wire and said second thermocouple wire; and
(g) a means for attaching said ceramic tube to one of the heater walls, wherein said ceramic tube second end opening is exposed to ambient air to allow said interior chamber of said ceramic tube to be in pressure communication with said ambient air.

7. The device of claim 6 wherein said means for attaching said second end opening further comprises:
(i) a pipe adapter with a first end and a second end, said ceramic tube second end matingly engaging said pipe adapter first end; and
(ii) a pipe reducer threadably attached to a plate rigidly fixed to one of the heater walls, wherein said first end of said adapter is inside said heater and fits into a first end of said pipe reducer, and wherein said second end of said reducer is positioned outside the heater and has an opening to ambient air.

* * * * *